United States Patent

[11] 3,620,675

[72] Inventor Carter L. Olson
 Columbus, Ohio
[21] Appl. No. 797,965
[22] Filed Feb. 10, 1969
[45] Patented Nov. 16, 1971
[73] Assignee The Upjohn Company
 Kalamazoo, Mich.

[54] APPARATUS FOR THE MEASUREMENT OF DISSOLUTION RATES
 6 Claims, 1 Drawing Fig.
[52] U.S. Cl. .................................................. 23/230 R,
 23/253 R, 23/292, 23/311, 23/267 B
[51] Int. Cl. ...................................................... B01f 1/00,
 G01m 21/28, G01m 27/46
[50] Field of Search ......................................... 23/230,
 253, 259, 292, 309–312, 267; 73/432; 35/20

[56] References Cited
OTHER REFERENCES

Childs, R. F. et al., American Journal of Pharmaceutical Education Vol. 223, pp. 418– 419 (1959)
Gershberg, S. et al., Journal of the American Pharmaceutical Assn., Vol. 35, pp. 284– 287 (1946) Scientific Edition
Ridout, C. W. et al., The Pharmaceutical Journal, Vol. 179, pp. 153– 154 (1957)
Sperandio, G. J. et al., Journal of the American Pharmaceutical Assn., Vol. 37, pp. 71– 76 (1948) Scientific Edition Primary Examiner—Morris O. Wolk
Assistant Examiner—Elliott A. Katz
Attorneys—Eugene O. Retter and John Kekich ABSTRACT: An apparatus for the measurement of dissolution rates of solid materials such as tablets, capsules, modules, or the like, includes a dissolution fluid reservoir, pumping means for the fluid, a dissolution chamber adapted to receive a solid material to be dissolved and the dissolution fluid, and means for measuring the concentration of the dissolved solid in the effluent from the dissolution chamber.

PATENTED NOV 16 1971 3,620,675
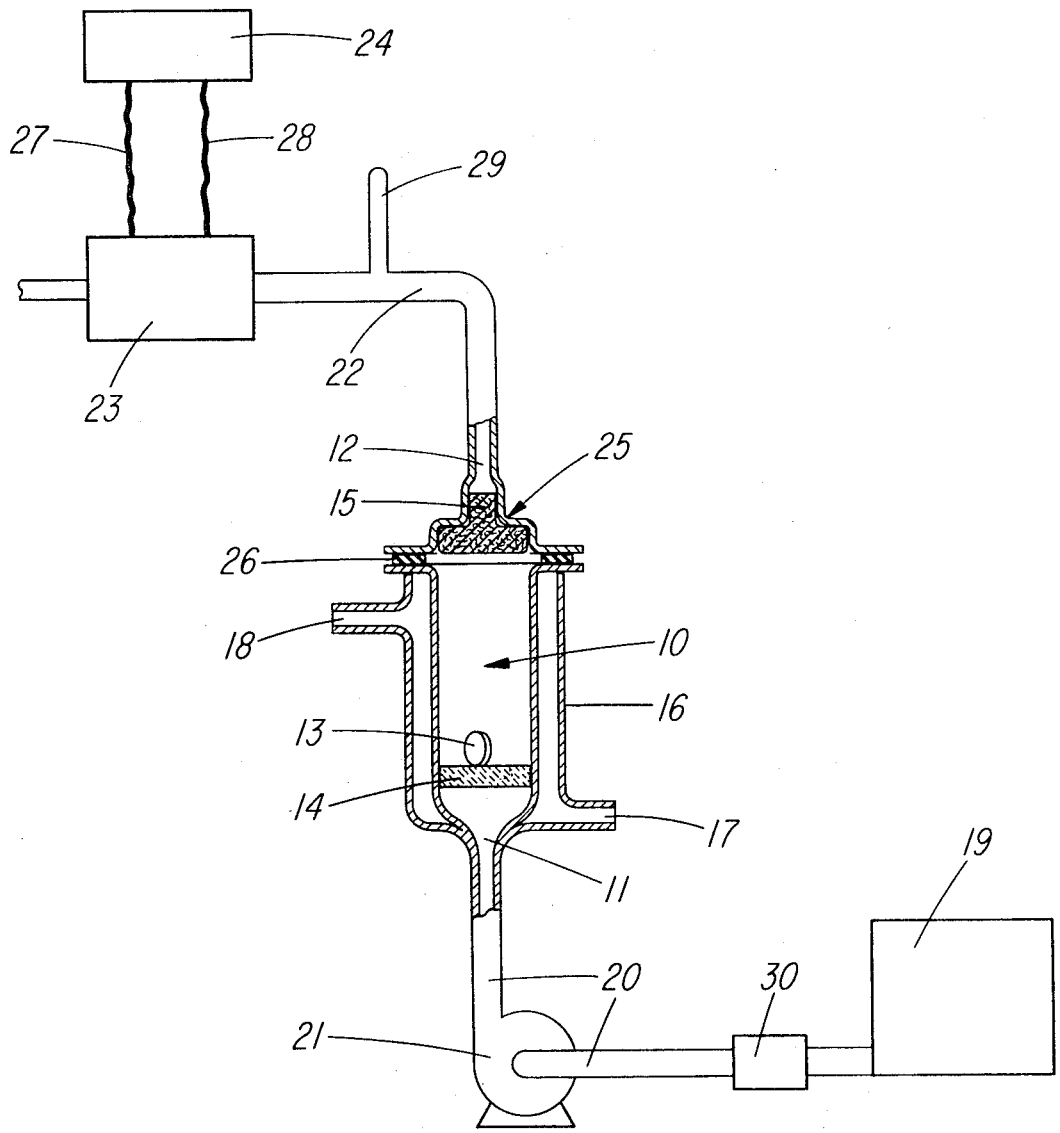
INVENTOR.
CARTER L. OLSON
BY
ATTORNEY

APPARATUS FOR THE MEASUREMENT OF DISSOLUTION RATES

BACKGROUND OF THE INVENTION

Dissolution rates of drugs in solid dosage forms such as tablets, capsules, modules, or the like are of great importance in the manufacture of pharmaceutical products. Knowledge of the dissolution rates of particular solids not only facilitates manufacturing and quality control, but also aids in the design of better medicaments and more effective dosage forms.

At the present, rates of dissolution are customarily ascertained by subjecting the material to be dissolved to agitation in a particular fluid and periodically determining the concentration of the solute in the resulting solution by manual analytical methods. Such procedures are tedious, cumbersome, and time consuming, and are not readily adaptable to manufacturing control when sizeable amounts of a particular medicament are to be produced. Moreover, such methodology for the measurement of dissolution rates requires relatively large volumes of dissolution fluid which are quite cumbersome.

The continuous flow dissolution rate measuring apparatus disclosed herein is particularly well suited for the determination of dissolution rates of poorly soluble materials which, by virtue of their low solubility, require a substantial time period to produce a readily measureable concentration gradient when conventional methodology is employed.

A unique feature of the apparatus of the present invention is that the property measured in the dissolution fluid stream, such as absorbance, conductance, or the like, is a function of concentration of the dissolved material, which, in turn, is a function of the dissolution rate. That is, $$C = 1/V \cdot dQ/dt$$

where $C$ represents the concentration of the dissolved material in the system at any time $t$;

$dQ/dt$ represents the amount of material dissolved per unit time; and $V$ represents the volume flow rate of the dissolution fluid past the material to be dissolved.

Thus, inasmuch as the concentration $C$ is directly proportional to the dissolution rate $dQ/dt$, the latter value is obtainable directly from the concentration measurements with little or no added calculations, depending on the readout accessories that are used. Moreover, in any given instance the dissolution rate can be readily followed as a function of time. Also, a particular dissolution rate can be easily compared to a control rate without the need of additional mathematical treatment of the obtained data.

A further feature of the present apparatus is that the concentration differential of dissolved material may be varied at will by varying the flow rate and adjusted to ensure the desired conditions for a particular measurement. The aforesaid concentration differential is represented by the term $(C_s - C)$ in the modified Noyes-Whitney relationship $$-dC/dt = K \cdot S (C_s - C)$$

where $dC/dt$ represents the rate of change of concentration, i.e., of dissolution, as a function of time;

$S$ represents the available surface of the dissolving material;

$K$ represents the dissolution rate constant incorporating flow rate and temperature factors;

$C_s$ represents the concentration of the dissolved material in a saturated system.

$C$ represents the concentration of the dissolved material in the system at any time $t$.

It is the principal object of the present invention to provide an apparatus and a method for the determination of dissolution rates of solid materials which require very little attention by an operator and which can be readily adapted to automation.

Still other objects will present themselves to the skilled artisan upon reference to the ensuing specification, the drawing, and the claims.

SUMMARY OF THE INVENTION

The foregoing objects are achieved by a dissolution chamber adapted to receive and hold a solid material to be dissolved and to permit contact by a dissolution fluid therewith. Fresh dissolution fluid is continuously caused to flow past the material and the concentration of the latter in the resulting solution is monitored. BRIEF DESCRIPTION OF THE DRAWING In the drawing, the FIGURE represents a schematic arrangement of the elements of the apparatus together with an elevation of a dissolution chamber, the latter being partially broken away to show interior detail.

DESCRIPTION OF THE PREFERRED EMBODIMENTS

Referring to the FIGURE, a dissolution chamber 10, having an elongated shape, is provided with a first open end 11 and second open end 12. The chamber 10 is adapted to contain a solid material to be dissolved, such as a tablet 13 or the like, which is retained within the chamber by fluid-permeable, solids-retaining means such as a glass frit 14 and a fibrous plug 15. Alternatively, the plug 15 can be replaced by a glass frit similar to frit 14. Optionally a jacket 16 can be provided enveloping chamber 10 and adapted to contain a heat transfer fluid such as water, for example, thereby affording close temperature control within chamber 10. The heat transfer fluid normally enters the jacket 16 through opening 17 and exits through opening 18. Downstream from chamber 10 is placed a bubble trap 29 to remove bubbles from the fluid before it reaches the detector 23.

A dissolution fluid reservoir 19 communicates with chamber 10 via a confined-flow passageway 20 and provides a supply of dissolution fluid for chamber 10. The fluid is transported to and through chamber 10 via the open end 11 by a fluid transport means such as a pump 21. The fluid flow rate is measured by means of a suitable flowmeter 30 situated in passageway 20 or 22. Preferably the flowmeter is interposed on passageway 20.

After contacting the solid material to be dissolved, such as tablet 13, the dissolution fluid exits from chamber 10 via the open end 12 and passageway 22, and passes through a detecting means 23 which can be an ultraviolet absorbance spectrophotometer, ultraviolet-visible polarimeter, infrared absorption spectrophotometer with or without attenuated total reflectance cells, voltametric detectors, conductometric detectors, or the like. Alternatively, a sample may be withdrawn periodically from the stream exiting from chamber 10 by means of a three-way solenoid valve, not showing in the FIGURE, and diverted to a suitable gas chromatograph.

The detecting means 23 can be connected with leads 27 and 28, or the like, to a suitable recording means 24 which records the concentration of the resulting solute in the dissolution fluid as measured by the detecting means 23.

In order to facilitate the loading and unloading of chamber 10, it can be provided with a removable stop section 25 which can be clamped on or held together with the remainder of the chamber 10 by any suitable means. If desired, a sealing gasket 26 can be provided around the top section 25.

In operation, the dissolution rate of a given solid material is effectively and reproducibly ascertained by loading the solid material in chamber 10 and pumping fresh dissolution fluid therethrough while monitoring the solute concentration in the fluid. Thus a continuous flowing stream of fresh dissolution fluid is moved at a known rate past the material to be dissolved, and its solvent effect on the solid material is noted by the detecting means 23. In this manner the dissolution rate of a particular medicament can be readily and reproducibly ascertained with minimum attention by a technician or other human operator. Once the dissolution fluid passes through the detecting means, it can be discarded, if desired.

I claim:

1. Apparatus for ascertaining the rate of dissolution of a solid material in a particular fluid which comprises means for retaining said solid material in a dissolution chamber, means for flowing said fluid through said dissolving chamber at a known rate in contact with said solid material, and means for monitoring the resulting concentration of said solid material dissolved in said fluid.

2. The apparatus in accordance with claim 1 wherein the dissolution chamber is an elongated, vertically disposed, cylindrical container having an opening at the bottom through which said fluid is admitted and an opening at the top through which said fluid containing dissolved said solid material is exited to the monitoring means.

3. The apparatus in accordance with claim 2 wherein the said means for retaining said solid material in said dissolution chamber comprises fluid-permeable, solids-retaining glass frits situated within the dissolution chamber in a spaced relationship to each other and adapted to receive therebetween a solid material to be dissolved.

4. The apparatus in accordance with claim 2 wherein the said means for retaining said solid material in said dissolution chamber comprises a fluid-permeable, solids-retaining glass frit situated within the dissolution chamber near the bottom opening and a fibrous plug situated within the dissolution chamber near the top opening.

5. A method for ascertaining the rate of dissolution of a solid material in a particular fluid which comprises continuously moving said fluid at a known rate past said solid material and in contact therewith, and monitoring the resulting concentration of said solid material dissolved in said fluid.

6. The method in accordance with claim 5 wherein said fluid contains no dissolved solid material therein prior to the contact thereof with said solid material.

* * * * *